United States Patent [19]

Brodoway

[11] 3,987,126

[45] Oct. 19, 1976

[54] FLUOROELASTOMER BLEND COMPOSITION

[75] Inventor: Nicolas Brodoway, Claymont, Del.

[73] Assignee: E. I. Du Pont de Nemours and Company, Wilmington, Del.

[22] Filed: July 31, 1975

[21] Appl. No.: 600,578

[52] U.S. Cl. ............................... 260/884; 260/900; 260/827
[51] Int. Cl.² ........................................ C08L 27/18
[58] Field of Search ............... 260/900, 884, 827

[56] References Cited
UNITED STATES PATENTS

| | | | |
|---|---|---|---|
| 2,965,619 | 12/1960 | Honn et al. | 260/79.5 |
| 3,306,879 | 2/1967 | Pattison | 260/77.5 |

Primary Examiner—Carman J. Seccuro

[57] ABSTRACT

A fluoroelastomer composition which is very useful for the manufacture of cured fluoroelastomer articles having desirable chemical and heat resistance combined with excellent low temperature flexibility can be prepared by blending specified amounts of the following: (A) an elastomeric copolymer of tetrafluoroethylene, a perfluoroalkyl perfluorovinyl ether and a bromine-containing olefin and (B) a certain fluoropolymer having perfluoroalkyl end groups containing an iodine atom; and when making the cured articles, it also preferred to add (C) an organic peroxide curing agent, (D) a co-curing agent such as triallyl isocyanurate and (E) a suitable metal compound such as a divalent metal oxide or hydroxide.

17 Claims, No Drawings

FLUOROELASTOMER BLEND COMPOSITION

BACKGROUND OF THE INVENTION

This invention relates to fluoroelastomer compositions made by blending two different types of fluoropolymers. Preferred embodiments of the invention concern such compositions which also contain additives which render the compositions useful for the manufacture of cured fluoroelastomer articles.

In the industries which manufacture and use fluoroelastomers, there is a need for a composition which can be used for the manufacture of cured fluoroelastomer articles having good low temperature flexibility combined with good chemical and heat resistance.

SUMMARY OF THE INVENTION

The present invention provides a fluoroelastomer composition which comprises

A. an elastomeric copolymer of
tetrafluoroethylene,
a perfluoroalkyl perfluorovinyl ether wherein the alkyl group contains 1–5 carbon atoms, and
a bromine-containing olefin in an amount such that said copolymer has a bromine content of about 0.3–3.0% by weight,
the tetrafluoroethylene/vinyl ether molar ratio (in the polymer) being about 50/50 to 80/20, and B. a polymer of the structure

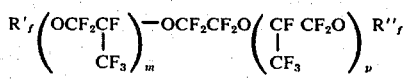

wherein $R'_f$ and $R''_f$ are perfluoroalkyl groups except that at least one contains an iodine atom in place of a fluorine atom, and $m$ and $p$ are whole numbers, the sum of which is about 6–100, the component (A)/component (B) weight ratio being about 50/50 to 90/10.

DESCRIPTION OF PREFERRED EMBODIMENTS

In preparing the component (A) elastomeric copolymer, one will usually prefer to use perfluoromethyl perfluorovinyl ether as the vinyl ether component.

When it is stated that component (A) is a "copolymer of" the three specified monomers, this means that component (A) is a copolymer whose interpolymerized units consist essentially of units derived from the three specified monomers.

It is often preferred to use enough of the bromine-containing olefin so that the component (A) copolymer has a bromine content of about 0.5–1.5% by weight. An especially preferred bromine-containing olefin is bromotrifluoroethylene; another very useful one is 4-bromo-3,3,4,4-tetrafluorobutene-1. The term "bromine-containing olefin" herein means an olefin in which at least one hydrogen atom has been replaced with a bromine atom, and optionally one or more of the remaining hydrogen atoms have been replaced with an atom of another halogen, preferably fluorine. Some compounds of this type are available commercially, and others can be prepared by methods known in the art, for example as shown by Tarrant and Tunden in 34 J. Org. Chem. 864 (1969) and by Fainberg and Miller in 79 JACS 4170 (1957). Other useful bromine-containing olefins besides the two already mentioned are illustrated as follows: vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4,-pentafluorobutene, 6-bromo-5,5,6,6-tetrafluorohexene, 4-bromoperfluorobutene-1, and 3,3-difluoroallyl bromide.

In making the component (A) bromine-containing fluoroelastomer, it is preferred that the reaction mixture of monomer components also contains a free-radical initiator, and the copolymer-forming reaction is carried out as a free-radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as sodium lauryl sulfate or ammonium perfluorooctanoate. The surfactant can be selected from those known to be useful in the manufacture of fluoropolymers. A surfactant can of course also be present when using an inorganic initiator. A suitable known chain transfer agent can also be present during the emulsion polymerization reaction, but in many cases this is not preferred.

After completion of the preferred emulsion polymerization reaction, the copolymer can be isolated from the resulting polymer latex by known methods, for example by coagulation by adding an electrolyte or by freezing, followed by centrifuging or filtering and then drying the copolymer.

The copolymer-forming reaction can also be carried out in bulk, or in an organic liquid containing an organic free-radical initiator. It is usually preferred that none of the organic liquid present is a chain transfer agent.

During preparation of the copolymer, the reaction mixture is preferably heated in a reactor which has been flushed with an inert gas at about 50°–130° C. under superatmospheric pressure, for example under a pressure of about 0.7–14 MPa (megapascal), preferably about 3.5–10.5 MPa. In some of the most useful procedures, the polymerization is carried out as a continuous process, and the reaction mixture has an average residence time in the reactor of about 2–3 hours. Residence time can be calculated by dividing the reactor volume by the volume of latex produced per hour.

The copolymer in the majority of cases will have an inherent viscosity of about 0.01 or higher, with special preference for an inherent viscosity of about 0.2–1.2. The inherent viscosity can be measured in the manner described below in Example 1.

The component (B) iodine-containing fluoropolymer can be prepared by first using the process described by Hill and Garabedian in U.S. Pat. No. 3,660,315 to make a fluoropolymer having perfluoroacyl fluoride end groups and having the formula shown in column 2, line 15 of that Patent. The resulting polymer is modified so that one or both of the end groups contain an iodine atom. Said modifying can be done by using the type of process taught by Hauptschein and Grosse in J. Am. Chem. Soc., 73 2461 (1951). Thus, the end groups of the Hill and Garabedian product can be converted to a perfluoroalkyl carboxylic acid silver salt, and this salt can be treated with iodine to form a perfluoroaklyl iodide. Preferably about 25–100% by weight of the component (B) polymer has the structure wherein there is an iodine atom in both of the end groups. In most cases, one will use a component (B) polymer wherein the sum of $m$ and $p$ ($m+p$ value) is about 10–40.

The composition containing only components (A) and (B) is a useful article of commerce which (as in the case of a single-component curable elastomer) can be supplied to manufacturers of fabricated elastomer articles who wish to modify the material with certain additives according to the requirements of particular applications before it is molded, extruded or otherwise made into cured end-products. Another useful approach (often a preferred one) is for the supplier of the composition to add one or more of components (C), (D) and (E) described below before the composition is delivered to the person who makes the cured products.

One material which is preferably blended with the composition to be used for the manufacture of cured fluoroelastomer products is an organic peroxide; this referred to herein as component (C). The component (C) peroxide curing agent is added in an amount equal to about 0.5–10%, preferably about 1.5–5%, based on the total weight of components (A) and (B). A dialkyl peroxide is usually preferred. An organic peroxide is selected which will function as a curing agent for the composition in the presence of the other ingredients which are to be present in the end-use composition and under the temperatures to be used in the curing operation without causing any harmful amount of curing during mixing or other operations which are to precede the curing operation. A dialkyl peroxide which decomposes at a temperature above 49° C. is especially preferred when the composition is to be subjected to processing at elevated temperatures before it is cured. In many cases one will prefer to use a di-tertiarybutyl peroxide having a tertiary carbon atom attached to a peroxy oxygen. Among the most useful peroxides of this type are 2,5-dimethyl-2,5-di(tertiarybutylperoxy) hexyne-3 and 2,5-dimethyl-2,5-di(tertiarybutylperoxy) hexane. Component (C) can also be selected from such compounds as dicumyl peroxide, dibenzoyl peroxide, tertiary butyl perbenzoate and di[1,3-dimethyl-3-(t-butylperoxy)butyl]-carbonate and the like.

To illustrate an application where one can use a component (C) compound which decomposes at or below 49° C, one can carry out the steps of preparing the composition at room temperature as a liquid film-forming composition containing an organic solvent and/or diluent, applying a layer of the liquid composition to a substrate, and allowing the layer to become dried and cured at or below 49° C.

Another material which is usually blended with the composition before it is made into end products is a coagent composed of a polyunsaturated compound which is capable of cooperating with said peroxide to provide a useful cure. This material, which can be referred to as component (D), is added in an amount equal to about 0.5–10%, preferably about 1–7%, based on the total weight of components (A) and (B). It is preferred in many applications to use as a component (D) coagent one or more of the following compounds: triallyl cyanurate; triallyl isocyanurate; tris(diallylamine)-s-traizine; triallyl phosphate, N,N-diallyl acrylamide; hexa-allyl phosphoramide; N,N,N',N'-tetraallyl terephthalamide; N,N,N'N'-tetrallyl malonamide; trivinyl isocyanurate; 2,4,6-trivinyl methyltrisiloxane; and tri(5-norbornene-2-methylene) cyanurate; and the like. Particularly useful are triallyl isocyanurate and triallyl cyanurate.

Another material which is usually blended with the composition before it is made into end products is at least one metal compound selected from divalent metal oxides and divalent metal hydroxides. This material can be referred to as component (E). A metal salt of a weak acid can be used along with the oxide and/or hydroxide. Component (E) is added in an amount equal to about 1–15%, preferably about 2–10%, based on the total weight of components (A) and (B). Metal compounds useful as component (E) are further described by Bowman in U.S. Pat. No. 3,686,143.

The composition can also contain one or more additives such as those known to be useful in fluoroelastomer compositions, for example pigments, fillers, pore-forming agents and liquid organic solvents. An example of a useful type of solvent is the one described by Proskow in U.S. Pat. No. 3,740,369. By adding a suitable solvent, one can prepare a liquid composition useful in the preparation of adhesive layers, coatings, films and the like.

In preparing the present fluoroelastomer composition, one can mix the ingredients by means of any mixing apparatus known to be useful for preparing rubber or plastic compositions; for example, one can use a roller-type rubber mill or Banbury mixer equipped to operate at a temperature below the decomposition temperature of the organic peroxide or any other heat-sensitive material which might be present.

The curing agent-containing composition can be cured by subjecting it to conditions which result in the decomposition of the organic peroxide, for example by heating the composition at a temperature which causes the peroxide to decompose. The initial curing of the curable composition containing components A, B, C, D, and E in most cases is preferably carried out by heating the composition for about 1–60 minutes at about 149°–204° C; conventional rubber- and plastic-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 180°–300° C. One skilled in the art will realize that the best curing time and temperature for a particular application will depend on such factors as the nature and proportion of ingredients and the properties needed in the final product.

Fluoroelastomer compositions can easily be made in accordance with the present invention in vulcanizable grades suitable for compounding and curing by practicable and economical methods to yield highly useful cured fluoroelastomer articles for applications such as gaskets, O-rings, films, coated fabrics, wire insulation, hoses, protective coatings and the like, which have good low temperature flexibility and good resistance to damage by heat, solvents and corrosive chemicals. Cured articles are obtainable which remain flexible at temperatures well below 0° C., for example down to about −50° C.

The following examples illustrate the invention; all amounts are by weight unless otherwise indicated.

EXAMPLE 1

A curable fluoroelastomer material of the present invention is prepared by carrying out procedures X, Y, and Z as follows.

Procedure X

First, a bromine-containing fluoroelastomer of the component (A) type described above is prepared by a continuous process composed of the following operations:

1. Continuously feeding the three monomers described below in Table I to a 3.8 liter stainless steel pressure vessel reactor (polymerization reaction zone) which has been flushed with nitrogen, while operating the stirrer of the reactor at 500 rpm for thorough mixing of the reactor contents, and while the contents of the reactor are heated at 70° C. under a pressure of 4.2 MPa so that the reaction mixture formed in operation (2) below will undergo an emulsion polymerization reaction as it passes through the reactor, the reactor residence time being about 2.7 hours based on the ratio of the 3.8 liter reactor to the emulsion output rate of about 1.4 liters per hour, the monomers and the feed rate for each being as shown below in Table I;

2. during operation 1, constantly feeding to the reactor through a first metering pump during each hour a solution composed of 6.38 grams of ammonium persulfate, 4.5 grams of dibasic sodium phosphate heptahydrate and 12.0 grams of ammonium perfluoro octanoate dissolved in 600 cm.$^3$ of water (distilled), and simultaneously feeding to the reactor through a second metering pump during each hour a solution composed of 5.25 grams of sodium sulfite dissolved in 600 cm.$^3$ of water, the reaction mixture being maintained at a pH of 6.1;

3. continuously removing from the reactor the resulting copolymer latex which is continuously formed during operations 1 and 2, the latex being passed through a back-pressure regulating valve set to maintain the desired reactor pressure of 4.2 MPa, and then through a sealed container from which the off-gas (unreacted monomers) is led to a gas chromotograph where its composition is determined and recorded in Table I below;

4. after discarding the latex obtained during the first four residence times, collecting the desired quantity of latex and mixing it for uniformity, the latex having a pH of about 6.1 and a copolymer solids content of 26.0%; and 5. isolating the resulting copolymer from the latex by the gradual addition of a 4% aqueous solution of potassium aluminum sulfate until the copolymer is coagulated, washing the copolymer particles with distilled water, removing the water by means of a filter apparatus, and then drying the copolymer in a circulating air-oven at 100° C. to a moisture content of less than 1%.

Table I

| Monomer | Feed | | Off-Gas | Incorporated in Polymer | |
|---|---|---|---|---|---|
| | g./hr. | g./hr. | g./hr. | Wt. % | Mole % |
| Tetrafluoroethylene | 260 | 14 | 246 | 56.0 | 68.5 |
| Perfluoromethyl perfluorovinyl ether | 300 | 117 | 183 | 41.6 | 30.0 |
| Bromotrifluoroethylene | 10 | 1 | 9 | 2.4 | 1.5 |
| Total | 570 | 132 | 438 | | |

The resulting component (A) copolymer contains in each 100 grams of polymerized units about 56 grams of polymerized tetrafluoroethylene, 41.6 grams of polymerized perfluoromethyl perfluorovinyl ether and 2.4 grams of bromotrifluoroethylene. The copolymer has an inherent viscosity of 0.38; this property is measured at 30° C. at a polymer concentration of 0.2% by weight in a solvent composed of 58% by volume of 2,3,3-trichloroperfluorobutene, 39% by volume of "FC-75" solvent and 3% by volume of diethylene glycol dimethyl ether. The "FC-75" solvent is a perfluoro cyclic ether type of solvent of the empirical formula $C_8F_{16}O$, sold under the 3M Company trade name "FC-75", and described in further detail in the above-mentioned Proskow U.S. Pat. 3,740,369. In place of this solvent one can use the product of fluorinating tetrahydrofuran until one obtains a solvent composed predominantly of 2-perfluorobutyl perfluorotetrahydrofuran. The copolymer has a bromine content of 1.2% by weight; and it is insoluble in aliphatic and aromatic hydrocarbons.

Procedure Y

Next, an iodine-containing fluoropolymer of the component (B) type described above is prepared by 1. making a fluoropolymer having perfluoroacyl fluoride end groups; this fluoropolymer, which has a molecular weight of about 5600 and an m+p value of 31, is made in the manner taught by Hill and Garabedian in Example 4 of U.S. Pat. No. 3,660,315;

2. placing 604.5 grams of the resulting polymer in a flame-dried 1-liter flask maintained under a dry nitrogen atmosphere;

3. disolving the polymer in the flask in 350 ml. of "Freon 113" (trichlorotrifluoroethane);

4. mixing 20 grams of powdered sodium fluoride with the resulting solution;

5. adding 25 cm.$^3$ of absolute ethanol to the resulting slurry drop-wise with stirring and continuing to stir the mixture for 90 minutes;

6. removing the mixture of sodium fluoride and sodium hydrogen fluoride present in the resulting composition by filtration, using a medium glass frit filter;

7. subjecting the resulting filtrate to distillation at 26 kPa until the "Freon 113" and ethanol are removed, whereby there remains in the distillation flask a residue composed of a layer of tetraglyme (from the polymer used in step 2) on top of a layer of HFPO (hexafluoropropylene oxide) polymer diester which contains traces of tetraglyme;

8. isolating the polymer diester by first using a separatory funnel to remove the top layer of tetraglyme and then extracting the polymer diester with diethyl ether to remove the remaining tetraglyme;

9. dissolving the polymer diester in an equal volume of "Freon 113";

10. mixing with the resulting solution a potassium hydroxide solution made by mixing 16.5 grams of 85% potassium hydroxide pellets with 200 ml. of absolute ethanol;

11. treating the resulting solution of dipotassium salt of HFPO polymer with activated carbon ("Darco" G60 from Fisher Scientific Co.) until its color is converted from dark to substantially clear;

12. using a rotary evaporator to remove the solvent components from the resulting composition by distillation at 133 Pa;

13. crushing the resulting salt cake (of step 11 polymer salt) in 500 cm.$^3$ of benzene;

14. distilling off some of the benzene along with any remaining ethanol and water;

15. collecting the salt on a medium glass frit filter;

16. drying the salt in a vacuum oven at 100° C. whereby the amount of dried salt obtained is about 458 grams;

17. mixing with the dried salt 700 ml. of anhydrous "Freon 113", 300 cm.$^3$ of anhydrous acetonitrile and 20 ml. of phosphorous oxytrichloride;

18. heating the mixture while it is stirred under reflux and nitrogen for 24 hours;

19. cooling the mixture to 25° C. and filtering it through a medium glass frit filter under nitrogen;

20. removing the "Freon 113" from the filtered mixture by distillation, and extracting the residue with anhydrous acetonitrile until it is substantially colorless;

21. heating the residue (fluoropolymer having acyl chloride end groups) to 100° C. at a pressure of 13.3 Pa to remove all traces of solvents, then storing the polymer under dry nitrogen; an infra-red spectrum of this polymer shows a carbonyl absorption band at 1800 cm.$^{-1}$, which indicates the presence of acyl chloride end groups;

22. adding 52 grams of the resulting polymer to a flame-dried flask equipped with a stirrer, reflux condenser and supply of nitrogen;

23. adding to the flask 5.8 grams of finely powdered silver oxide and 100 cm.$^3$ of "Freon" E-3 of the formula

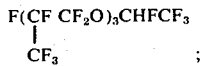

24. stirring the resulting slurry while gently refluxing it for 5.5 hours, then cooling it to 95° C.;

25. adding 7.6 grams of iodine to the slurry and gradually heating it to gentle reflux while stirring;

26. after refluxing at about 150° C. for 2 hours, allowing the mixture to cool to 24° C.;

27. removing the silver iodide from the mixture by filtration (medium glass frit), and removing the "Freon" E-3 by distillation at 133 Pa, thereby obtaining a colorless viscous liquid which is an iodine-containing fluoropolymer of the component (B) type described above. The polymer shows no carbonyl absorption bands in its infra-red spectrum, which indicates that each acyl chloride group has been replaced by an iodine atom. The polymer has an iodine content of about 3.5%, which represents a bifunctionality of about 56% of CF$_3$CFI- end groups. Thus, about 56% by weight of the polymer resulting from Procedure Y has the structure wherein there is an idoine atom in both of the end groups; the remainder of the polymer has an iodine atom in one end group.

Procedure Z

Finally, a quantity of curable fluoroelastomer material of the present invention is made by mixing 50 parts of the bromine-containing fluoroelastomer obtained in Procedure X with 50 parts of the iodine-containing fluoropolymer obtained in Procedure Y. The mixing is done on a 2-roll rubber mill whose rolls are at about 30° C.

The resulting composition, as mentioned previously, is a useful article of commerce which is suitable for compounding and curing by practical methods to yield highly useful cured fluoroelastomer articles.

EXAMPLE 2

A curable fluoroelastomer composition of the invention is prepared by repeating Example 1 except during Procedure Z the following ingredients are also added to the material being mixed on the rubber mill: 5 parts magnesium oxide, 2.5 parts calcium oxide, 2 parts triallyl cyanurate and 6 parts of peroxide curing agent (45% of 2,5-dimethyl-2,5-di(ditertiarybutylperoxy)hexyne-3 and 55% inert filler, sold by Wallace and Tiernan as "Luperco 130 XL").

Highly useful cured fluoroelastomer articles can be made by molding and curing the resulting composition.

Slab samples of the composition measuring about 2 mm. thick, 75 mm. wide and 150 mm. long are cured in a press for 30 minutes at 177° C. under a total force of 18 kN, and then post-cured in a oven for 24 hours at 232° C.

The cured material has excellent low temperature flexibility, and it is very resistant to damage by heat and chemicals. It has a glass transition temperature of about −60° C. The material is also resistant to damage by solvents. For example, when the cured material is subjected to extraction with "Freon" 113 for 72 hours (immersion at 25° C), it undergoes no loss in weight.

When a cured material outside the invention is made by mixing the following on a rubber mill and curing it as described above in Example 2, it has a glass transition temperature of −3.5° C: 100 parts of the bromine-containing fluoropolymer obtained in Procedure X, 10 parts magnesium oxide, 5 parts calcium oxide, 2 parts triallyl cyanurate and 6 parts of "Luperco 130 XL". Thus, in view of its very limited low temperature flexibility, this material is not useful in many applications where one can use the product of Example 2.

Useful results similar to those obtained in Example 2 are obtained when Example 2 is repeated except in preparing the bromine-containing fluoroelastomer (Procedure X), the bromotrifluoroethylene of Table I is replaced with 4-bromo-3,3,4,4-tetrafluorobutene-1.

I claim:
1. A fluoroelastomer composition which comprises
A. an elastomeric copolymer of
  tetrafluoroethylene,
  a perfluoroalkyl perfluorovinyl ether wherein the alkyl group contains 1–5 carbon atoms, and
  a bromine-containing olefin in an amount such that said copolymer has a bromine content of about 0.3—3.0 % by weight,
  the tetrafluoroethylene/vinyl ether molar ratio being about 50/50 to 80/20, and
B. a polymer of the structure

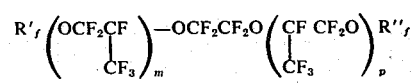

wherein R'$_f$ and R''$_f$ are perfluoroalkyl groups, at least one of which contains an iodine atom in place of a fluorine atom, and m and p are whole numbers, the sum of which is about 6-100, the component (A)/component (B) weight ratio being about 50/50 to 90/10.

2. A composition according to claim 1 which also contains
C. about 0.5–10% of an organic peroxide based on the combined weight of components (A) and (B).

3. A composition according to claim 2 which also contains
D. about 0.5–10%, based on the combined weight of components (A) and (B), of a coagent composed of polyunsaturated compound which is capable of cooperating with said peroxide to provide a useful cure.

4. A composition according to claim 3 which also contains
E. about 1–15%, based on the combined weight of components (A) and (B), of a metal compound selected from the group: divalent metal oxides and divalent metal hydroxides.

5. A composition according to claim 4 wherein the component (D) coagent is a compound selected from the group: triallyl cyanurate; triallyl isocyanurate; tris(-diallylamine)-s-triazine; triallyl phosphite, N,N-diallyl acrylamide; hexa-allyl phosphoramide; N,N,N'N'-tetra-allyl terephthalamide, N,N,N',N'-tetra-allyl malonamide; trivinyl isocyanurate; 2,4,6-trivinyl methyl-trisiloxane; and tri(5-norbornene-2-methylene) cyanurate.

6. A composition according to claim 1 wherein the vinyl ether of component (A) is perfluoromethyl perfluorovinyl ether.

7. A composition according to claim 5 wherein the component (C) peroxide is a dialkyl peroxide.

8. A composition according to claim 1 wherein the bromine-containing olefin of component (A) is bromotrifluoroethylene.

9. A composition according to claim 1 wherein the component (A) copolymer has a bromine content of about 0.5–1.5% by weight.

10. A composition according to claim 5 wherein component (C) is a peroxide which decomposes at a temperature above 49° C.

11. A composition according to claim 10 wherein component (C) is a di-tertiarybutyl peroxide.

12. A composition according to claim 11 wherein component (C) is 2,5-dimethyl-2,5-di(tertiarybutylperoxy) hexyne-3.

13. A composition according to claim 11 wherein component (C) is 2,5-dimethyl-2,5-di(tertiarybutylperoxy) hexane.

14. A composition according to claim 5 wherein the component (C) peroxide content is about 1.5–5% based on the combined weight of components (A) and (B).

15. A composition according to claim 5 wherein the component (D) coagent content is about 1–7% based on the combined weight of components (A) and (B).

16. A composition according to claim 5 wherein the component (E) metal compound content is about 2–10% based on the combined weight of components (A) and (B).

17. A composition according to claim 5 wherein the component (D) coagent is triallyl isocyanurate or triallyl cyanurate.

* * * * *